US011021964B2

(12) United States Patent
Fromonteil et al.

(10) Patent No.: US 11,021,964 B2
(45) Date of Patent: Jun. 1, 2021

(54) COMPOSITE VANE WITH METAL REINFORCEMENT, AND ITS METHOD OF MANUFACTURE

(71) Applicant: SAFRAN AIRCRAFT ENGINES, Paris (FR)

(72) Inventors: Didier Fromonteil, Moissy-Cramayel (FR); Alexandre Dalloz, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 96 days.

(21) Appl. No.: 16/527,149

(22) Filed: Jul. 31, 2019

(65) Prior Publication Data

US 2020/0040742 A1    Feb. 6, 2020

(30) Foreign Application Priority Data

Jul. 31, 2018  (FR) ...................... 1857143

(51) Int. Cl.
   *F01D 5/14*   (2006.01)
   *F01D 5/18*   (2006.01)
   *F01D 5/30*   (2006.01)

(52) U.S. Cl.
   CPC .............. *F01D 5/18* (2013.01); *F01D 5/147* (2013.01); *F01D 5/30* (2013.01); *F05D 2220/323* (2013.01); *F05D 2220/329* (2013.01); *F05D 2230/30* (2013.01); *F05D 2300/10* (2013.01); *F05D 2300/40* (2013.01)

(58) Field of Classification Search
   CPC ... F01D 5/147; F01D 5/18; F01D 5/30; F01D 9/041; F01D 9/042; F05D 2220/323; F05D 2220/329; F05D 2230/30; F05D 2300/10; F05D 2300/40
   See application file for complete search history.

(56) References Cited

U.S. PATENT DOCUMENTS

| 3,903,578 A | 9/1975 | Rothman | |
|---|---|---|---|
| 7,794,197 B2 * | 9/2010 | Thompson | F01D 5/282 415/9 |
| 9,387,533 B1 * | 7/2016 | Heneveld | B22C 9/04 |

(Continued)

FOREIGN PATENT DOCUMENTS

| EP | 3 064 708 A1 | 9/2016 |
|---|---|---|
| EP | 3 121 375 A1 | 1/2017 |
| FR | 3 011 269 A1 | 4/2015 |

OTHER PUBLICATIONS

Search Report as issued in French Patent Application No. 1857143, dated Mar. 26, 2019.

*Primary Examiner* — Matthew W Jellett
(74) *Attorney, Agent, or Firm* — Pillsbury Winthrop Shaw Pittman LLP

(57) ABSTRACT

A composite vane includes both a vane body extending in a longitudinal direction between an inner end and an outer end and also at least one fastener base connected to the inner end or to the outer end of the vane body. The vane includes metal reinforcement associated with an organic matrix. The metal reinforcement defines integrally as a single part both a longitudinal core extending between the inner and outer ends of the vane body and also the fastener base, the longitudinal core having the organic matrix overmolded thereon, the organic matrix defining the outside shape of the vane.

7 Claims, 5 Drawing Sheets

(56) References Cited

U.S. PATENT DOCUMENTS

| | | | |
|---|---|---|---|
| 10,793,943 B2* | 10/2020 | Malmborg | F01D 5/147 |
| 10,822,969 B2* | 11/2020 | Husband | F01D 5/147 |
| 2003/0129061 A1 | 7/2003 | Finn et al. | |
| 2015/0337664 A1* | 11/2015 | Cosi | F01D 5/18 |
| | | | 415/208.1 |
| 2016/0153295 A1 | 6/2016 | Pautard et al. | |
| 2016/0167269 A1* | 6/2016 | Pautard | F01D 5/147 |
| | | | 264/259 |

* cited by examiner

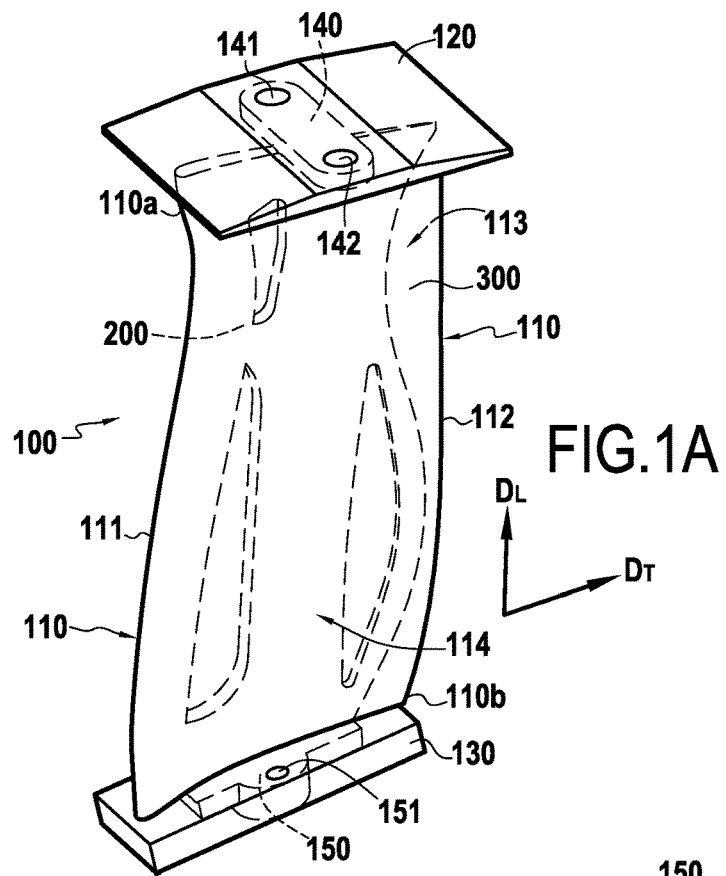
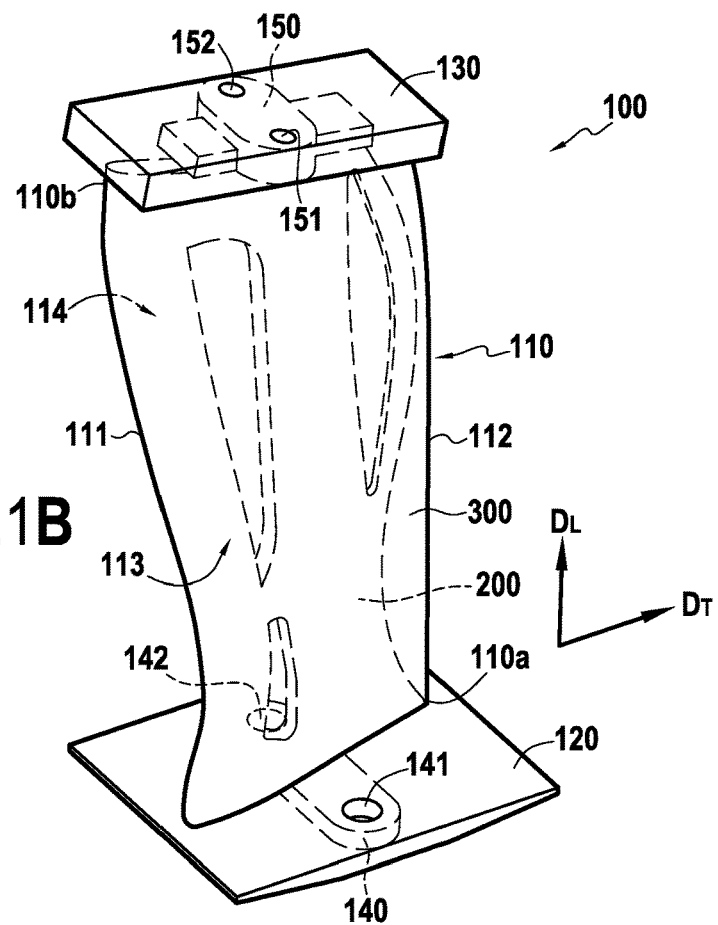

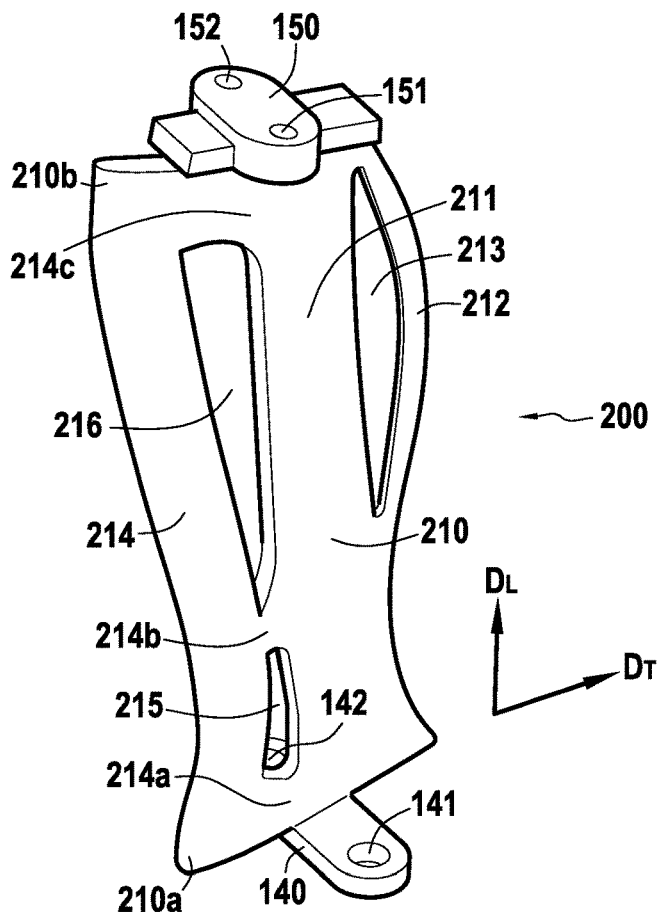
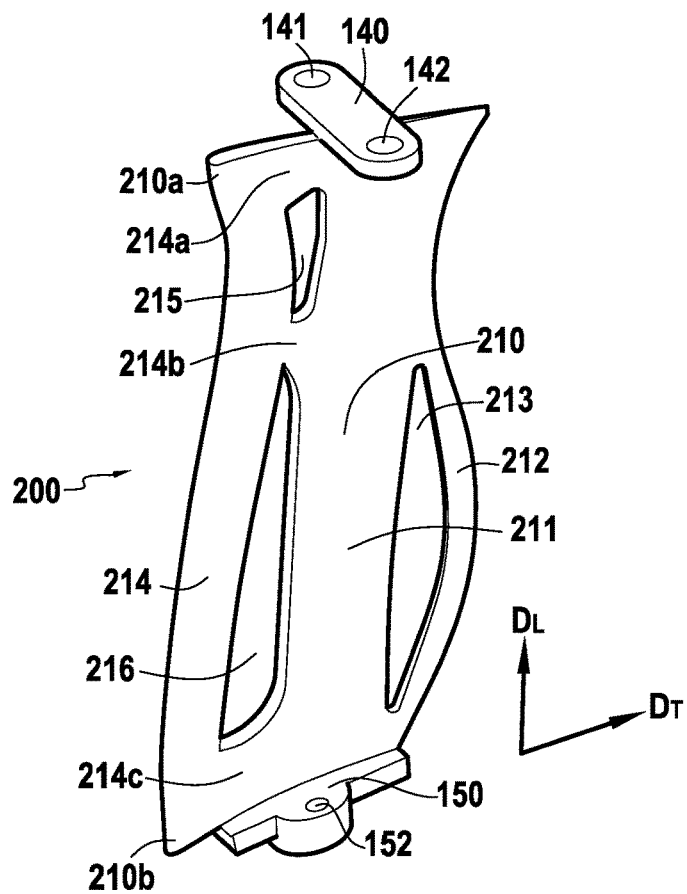
FIG.2A
FIG.2B

COMPOSITE VANE WITH METAL REINFORCEMENT, AND ITS METHOD OF MANUFACTURE

CROSS REFERENCES TO RELATED APPLICATIONS

This application claims priority to French Patent Application No. 1857143, filed Jul. 31, 2018, the entire content of which is incorporated herein by reference in its entirety.

FIELD

The present invention relates to the general field of vanes for gas turbine aeroengines and to the method of manufacturing them.

BACKGROUND

Such vanes may be fitted to any type of turbine engine whether terrestrial or for aviation, and by way of example to an airplane turbojet or to a helicopter turboshaft engine. In particular the vane may be an outlet guide vane (OGV), an inlet guide vane (IGV), or a variable stator vane (VSV).

In the field of turbine engines, vanes may be made of metal or of composite material. Document US 2016/153295 describes making a composite vane having a metal core associated with an organic matrix, the metal core forming the pressure side or the suction side face of the vane. Although such a composite vane presents the advantage of being lighter in weight than a vane made entirely out of metal, it needs to be designed particularly carefully since it is less robust than a metal vane. In particular, the portion(s) of the vane used for fastening it to the turbine engine need(s) to present good mechanical strength since such portions convey the aerodynamic forces to which the vane is subjected.

SUMMARY

A main aspect of the present invention is thus to provide a composite vane that is of relatively light weight while still presenting good mechanical strength for accommodating aerodynamic forces, and presenting fastening that is reliable.

In accordance with the invention, this aspect is achieved by a composite vane comprising both a vane body extending in a longitudinal direction between an inner end and an outer end and also at least one fastener base connected to the inner end or to the outer end of the vane body, the vane comprising metal reinforcement associated with an organic matrix, the vane being characterized in that the metal reinforcement defines integrally as a single part both a longitudinal core extending between the inner and outer ends of the vane body and also the at least one fastener base, the longitudinal core having the organic matrix overmolded thereon, the organic matrix defining the outside shape of the vane.

The metal reinforcement serves both to provide the vane with stiffness and also to provide its fastening with mechanical strength. Consequently, the metal reinforcement serves to make the composite vane structural in nature, and to do so with good control over the overall weight of the vane. Specifically, the metal material is used only to form a skeleton that serves to impart the required structural functions, with the remainder of the volume of the vane being occupied by the organic matrix, which serves essentially to define an aerodynamic profile of the vane and which presents density lower than that of a metal material.

According to a first particular characteristic of the vane of the invention, the metal reinforcement further comprises a protective portion forming a leading edge of the vane, the protective portion being made integrally with the longitudinal core and the at least one fastener base. By integrating the leading edge in the metal reinforcement, the leading edge portion of the composite vane is reinforced while greatly simplifying manufacture of the vane, in particular in comparison with manufacturing solutions that consist in fitting sheet metal on a composite preform.

According to a second characteristic of the vane of the invention, the longitudinal core includes one or more openings. The opening(s) serve(s) to form anchor points for the organic matrix, thereby reinforcing its mechanical retention on the reinforcement.

According to a third particular characteristic of the vane of the invention, the vane includes an inner fastener base connected to the inner end of the vane body and an outer fastener base connected to the outer end of the vane body, the inner and outer fastener bases both being defined by the metal reinforcement and being made integrally with the longitudinal core.

According to a fourth particular characteristic of the vane of the invention, the vane further comprises at least one inner or outer platform formed by the organic matrix.

An aspect of the invention also provides a method of manufacturing a composite vane comprising both a vane body extending in a longitudinal direction between an inner end and an outer end and also at least one fastener base connected to the inner end or to the outer end, the vane comprising metal reinforcement associated with an organic matrix, the method being characterized in that it comprises making metal reinforcement defining integrally as a single part both a longitudinal core extending between inner and outer ends and also at least one fastener base connected to the inner end or to the outer end of the longitudinal core, and overmolding an organic matrix on the metal reinforcement so as to define the outside shape of the vane.

As mentioned above, the metal reinforcement provides the vane with stiffness. It is thus possible to define reinforcement of a shape that is optimized as a function of the properties of the metal material used and of the operating conditions expected for the vane, such as the forces to which it is to be subjected, the level of vibration, its resonant frequency, etc.

The organic matrix used for defining the outside shape of the vane serves to finish off manufacturing the composite vane while controlling its overall weight.

According to a first particular characteristic of the method of the invention, making the metal reinforcement further comprises forming a protective portion forming a leading edge of the vane, the protective portion being formed integrally with the longitudinal core and the at least one fastener base. By making the leading edge directly with the metal reinforcement, manufacture of the vane is greatly simplified, in particular in comparison with manufacturing solutions that consist in fitting sheet metal on a composite preform.

According to a second particular characteristic of the method of the invention, the longitudinal core includes one or more openings. This serves to improve retention of the matrix on the reinforcement.

According to a third particular characteristic of the invention, making the metal reinforcement includes forming an inner fastener base connected to the inner end of the longitudinal core and an outer fastener base connected to the outer end of the longitudinal core, the inner and outer fastener bases being formed integrally with the longitudinal core.

According to a fourth particular characteristic of the method of the invention, the method includes forming at least one inner platform or at least one outer platform during overmolding of the organic matrix on the metal reinforcement.

An aspect of the invention also provides the application of the method of the invention for manufacturing a composite vane to manufacturing an outlet guide vane, an inlet guide vane, or a variable guide vane.

BRIEF DESCRIPTION OF THE DRAWINGS

Other characteristics and benefits of the present invention appear from the following description made with reference to the accompanying drawings, which show embodiments having no limiting character. In the figures:

FIGS. 1A and 1B are diagrammatic perspective views of an outlet guide vane in an embodiment of the invention;

FIGS. 2A and 2B are diagrammatic perspective views of the metal reinforcement of the FIG. 1 composite vane;

DETAILED DESCRIPTION

Figure 3:
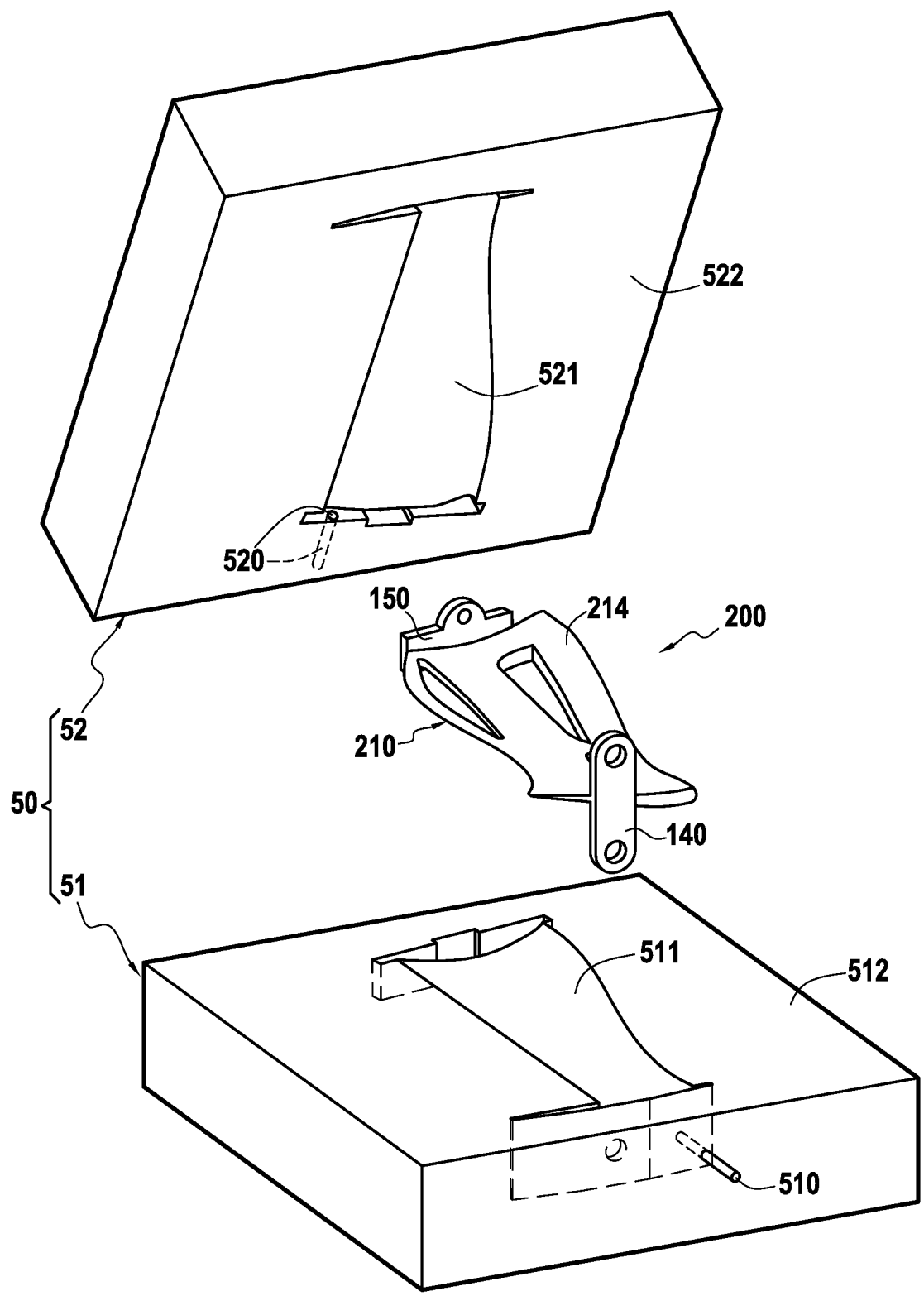
FIG. 3 is a diagrammatic perspective view showing the metal reinforcement of FIGS. 2A and 2B being put into place in an injection mold.

The invention applies to making composite vanes for a gas turbine aeroengine.

Non-limiting examples of such vanes include in particular outlet guide vanes (OGV), inlet guide vanes (IGV), and variable stator vanes (VSV), etc.

A method in accordance with an embodiment of the invention is described with reference to manufacturing a composite outlet guide vane such as the vane 100 shown in FIGS. 1A and 1B that comprises a vane body 110 extending in a longitudinal direction DL between an inner end 110b and an outer end 110a, and in a transverse direction DT between a leading edge 111 and a trailing edge 112. The vane body 110 also has a pressure side face 113 and a suction side face 114. The vane 100 also has an inner platform 130 connected to the inner end 110b of the vane body 110, and an outer platform 120 connected to the outer end 110a of the vane body 110. The vane 100 also has an inner fastener base 150 present in the inner platform 130, the inner fastener base 150 including fastener elements enabling the vane 100 to be fastened to an inner radial portion of an engine. By way of example, these fastener embodiments are two orifices 151 and 152 that are to receive fastener members, e.g. of the nut-and-bolt type. The vane 100 also has an outer fastener base 140 present in the outer platform 120, the outer fastener base 140 including fastener elements enabling the vane 100 to be fastened to a radially outer portion of an engine. By way of example, these elements are two orifices 141 and 142 that are to receive fastener members, e.g. of the nut-and-bolt type.

In accordance with the invention, the vane 100 includes metal reinforcement 200 that defines integrally as a single part both a longitudinal core 210 and also, the inner fastener base 150 connected to the inner end 210b of the core 210 that coincides with the inner end 110b of the vane body 110 and the outer fastener base 140 connected to the outer end 210a of the core 210 that coincides with the outer end 110a of the vane body 110. In the presently-described example, the longitudinal core 210 extends in the longitudinal direction DL and includes a central spar 211 connected to the inner and outer fastener bases 150 and 140, a curved portion 212 extending from the central spar 211 in the longitudinal and transverse directions DL and DT and defining a first opening 213, and a leading edge or projecting portion 214 extending in the longitudinal direction DL. The leading edge portion 214 is connected to the central spar 211 at three points 214a, 214b, and 214c so as to define second and third openings 215 and 216. The leading edge portion 214 forms the leading edge 111 of the vane 100.

The number of openings may vary as a function of the size of the vane and of the loading to which it is to be subjected in operation.

Still in accordance with the invention, the metal reinforcement 200 has an organic matrix 300 overmolded thereon, which matrix in this example defines both the aerodynamic shape of the vane 100, i.e. its pressure side and suction side faces 113 and 114, and also the final shape of the inner and outer platforms 130 and 120.

The method of manufacturing the composite vane 100 begins by making the metal reinforcement 200 as shown in FIGS. 2A and 2B. The metal reinforcement may be made using various known techniques such as, in particular: casting, die-stamping and welding, electroerosion, or additive manufacturing. In particular, the metal reinforcement may be made of aluminum, of titanium and its alloys, or of steel.

The method of manufacturing the composite vane continues by placing the metal reinforcement 200 in an injection mold, as shown in FIG. 3. The injection mold 50 comprises a first shell 51 having a first cavity 511 corresponding to a portion of the shape and the dimensions of the vane that is to be made, the cavity 511 being surrounded by a first contact plane 512. The first shell 51 also includes an injection port 510 for enabling an organic matrix to be injected. The mold 50 also includes a second shell 52 including in its center a second cavity 521 corresponding to a portion of the shape and the dimensions of the vane that is to be made, the second cavity 521 being surrounded by a second contact plane 522 that is to co-operate with the first contact plane 512 of the first shell 51. The second shell also includes at least one vent 520 placed opposite from the injection point for the purpose of venting gas during injection. The first and second shells may in particular be made of a metal material such as aluminum or steel, for example.

Figure 4:
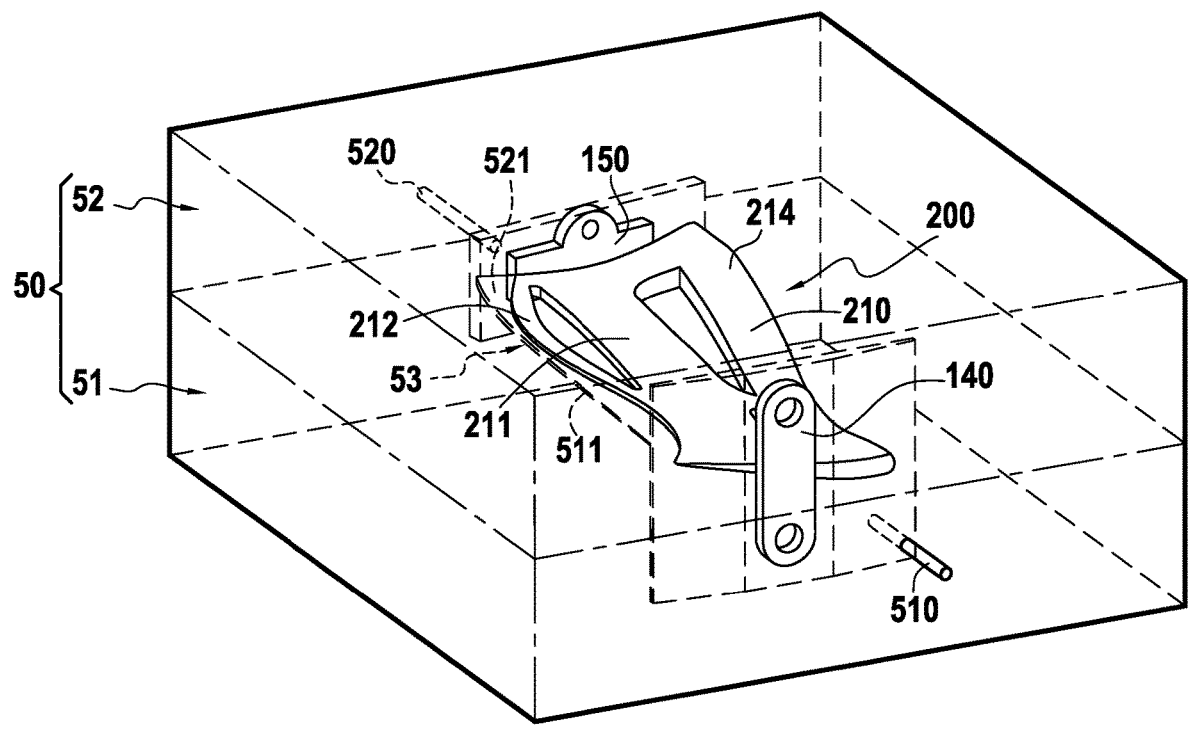
FIG. 4 is a diagrammatic perspective view showing the metal reinforcement of FIGS. 2A and 2B in a closed injection mold.
Figure 5:
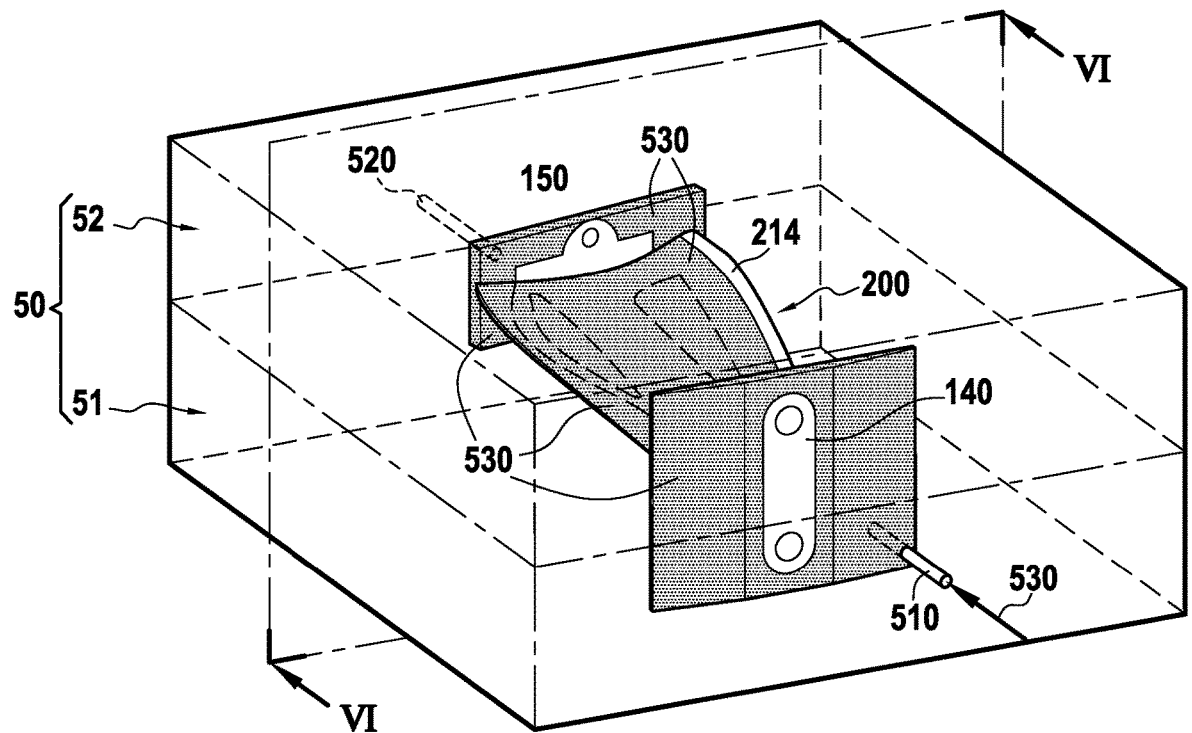
FIG. 5 is a diagrammatic perspective view showing resin being injected into the FIG. 4 mold.
Figure 6:
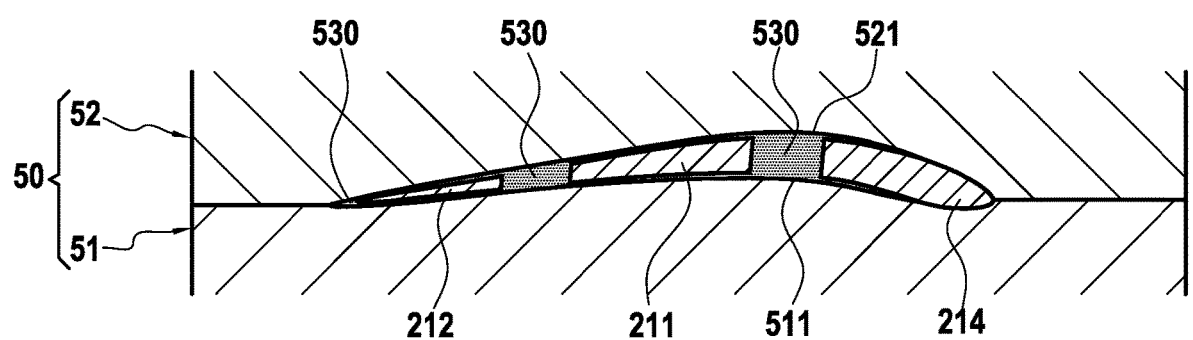
FIG. 6 is a section view of the FIG. 5 mold on section plane VI-VI of FIG. 5.

The metal reinforcement 200 is initially positioned in the cavity 511 of the first shell 51, the second shell 52 then being placed on the first shell 51 in order to close the injection mold 50, as shown in FIG. 4. In this configuration, the first and second cavities 511 and 521 together define an internal volume 53 having the shape of the vane that is to be made and in which the reinforcement 200 is present. In the presently-described example, the cavity 511 is for forming the pressure side of the vane while the cavity 521 is for forming the suction side of the vane. The cavities 511 and 521 also include portions that are to form the inner and outer platforms of the vane. Once the mold 50 has been closed, resin 530 is injected via the injection port 510 of the first shell 51 into the internal volume 53, as shown in FIG. 5. The vent 520 serves to vent the gas that is progressively replaced by the resin 530. As can be seen in FIG. 6, once the resin 530 has been injected into all of the internal volume 53, it fills all of the remainder of the internal volume 53 that is not already occupied by the reinforcement 200 so as to define the aerodynamic profile and the inner and outer platforms of the vane.

The resin used may in particular be selected from: the family of thermoplastic polymers such as polyaryletherketones (PAEK); the family of thermoplastic polyimides such as polyetherimides (PEI); the family of semi-aromatic polyamides; or the family of polyamides. The temperature class and/or the chemical nature of the resin is/are chosen as a function of the thermomechanical stresses to which the part is to be subjected. Once the resin has been injected throughout the internal volume 53, the resin is subjected to heat treatment at a temperature and for a duration that are determined in known manner as a function of the nature of the resin used. This produces the vane 100 as shown in FIGS. 1A and 1B.

Before being placed in the injection mold, the metal reinforcement may be coated in a bonding primer layer in order to improve the adhesion of the organic matrix on the reinforcement. The bonding primer may be a liquid or a suspension deposited by means of a brush, a spray gun, or by any other technique suitable for forming a primer layer having a thickness of a few micrometers on the surface of the metal reinforcement. By way of example, it is possible to use the "Xiameter® OFS-6032 Silane" primer supplied by the supplier Dow Corning.

In the presently-described example, the composite vane 100 has an inner platform 130 and an outer platform 120. Nevertheless, the composite vane of the invention could have only a single platform, which may be an inner platform or an outer platform. In addition, the inner platform may be overmolded using a damping material such as polyurethane, in particular when the vane is of small size and is fastened to the turbine engine solely via its outer fastener base. Under such circumstances, the inner platform of the vane is subjected to vibration and to movements that are damped by this material.

The vane of the invention may be provided with only an outer fastener base or with only an inner fastener base.

The invention claimed is:

1. A method of manufacturing a composite vane comprising both a vane body extending in a longitudinal direction between an inner end and also an outer end and at least one fastener base connected to the inner end or to the outer end, the composite vane comprising metal reinforcement associated with an organic matrix, wherein the method comprises making metal reinforcement defining integrally as a single part both a longitudinal core extending between inner and outer ends and also at least one fastener base connected to the inner end or to the outer end of the longitudinal core, and overmolding an organic matrix on the metal reinforcement so as to define an outside shape of the composite vane, wherein making the metal reinforcement includes forming an inner fastener base connected to the inner end of the longitudinal core and an outer fastener base connected to the outer end of the longitudinal core, the inner and outer fastener bases being formed integrally with the longitudinal core, and wherein the method further comprises forming an inner platform and an outer platform during overmolding of the organic matrix on the metal reinforcement.

2. The method according to claim 1, wherein making the metal reinforcement further comprises forming a protective portion forming a leading edge of the composite vane, the protective portion being formed integrally with the longitudinal core and said at least one fastener base.

3. The method according to claim 1, wherein the longitudinal core includes one or more openings.

4. A composite vane comprising both a vane body extending in a longitudinal direction between an inner end and an outer end and also at least one fastener base connected to the inner end or to the outer end of the vane body, the composite vane comprising metal reinforcement associated with an organic matrix, wherein the metal reinforcement defines integrally as a single part both a longitudinal core extending between the inner and outer ends of the vane body and also said at least one fastener base, the longitudinal core having the organic matrix overmolded thereon, the organic matrix defining an outside shape of the composite vane, said composite vane further comprising an inner and outer platform formed by overmolding the organic matrix on the metal reinforcement, wherein the composite vane comprises an inner fastener base connected to the inner end of the vane body and an outer fastener base connected to the outer end of the vane body, the inner and outer fastener bases both being defined by the metal reinforcement and being made integrally with the longitudinal core.

5. The composite vane according to claim 4, wherein the metal reinforcement further comprises a protective portion forming a leading edge of the vane, the protective portion being made integrally with the longitudinal core and said at least one fastener base.

6. The composite vane according to claim 4, wherein the longitudinal core includes one or more openings.

7. A method comprising manufacturing an outlet guide vane, an inlet guide vane, or a variable guide vane with the method according to claim 1.

* * * * *